United States Patent
Bhogal et al.

(10) Patent No.: US 9,258,512 B2
(45) Date of Patent: Feb. 9, 2016

(54) DIGITAL VIDEO RECORDER BROADCAST OVERLAYS

(71) Applicant: International Business Machines Corporation, Armonk, NY (US)

(72) Inventors: Kulvir Singh Bhogal, Pflugerville, TX (US); Gregory Jensen Boss, Saginaw, MI (US); Rick Allen Hamilton, II, Charlottesville, VA (US); Andrew R. Jones, Round Rock, TX (US); Brian Marshall O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 13/852,087

(22) Filed: Mar. 28, 2013

(65) Prior Publication Data

US 2013/0208187 A1 Aug. 15, 2013

Related U.S. Application Data

(63) Continuation of application No. 12/407,992, filed on Mar. 20, 2009, now abandoned.

(51) Int. Cl.
*G06F 13/00* (2006.01)
*H04N 5/445* (2011.01)
(Continued)

(52) U.S. Cl.
CPC ........... *H04N 5/445* (2013.01); *H04N 5/44513* (2013.01); *H04N 5/765* (2013.01);
(Continued)

(58) Field of Classification Search
CPC ... H04N 5/44513; H04N 5/765; H04N 5/445; H04N 21/434; H04N 21/4438; H04N 21/478; H04N 21/4858; H04N 21/4312; H04N 9/8205; H04N 9/8227

USPC ..................... 726/30; 713/178, 186
See application file for complete search history.

(56) References Cited

U.S. PATENT DOCUMENTS 6,038,368 A 3/2000 Boetje et al.
6,317,127 B1 * 11/2001 Daily et al. ................... 345/629
(Continued)

FOREIGN PATENT DOCUMENTS

JP 09163260 A 6/1997
JP 2000138908 A 5/2000
(Continued)

OTHER PUBLICATIONS

U.S. Appl. No. 12/407,992, filed Mar. 20, 2009, 38 pages.
(Continued)

*Primary Examiner* — Mohammad A Siddiqi
(74) *Attorney, Agent, or Firm* — Yee & Associates, P.C.; Lisa J. Ulrich (57) ABSTRACT

A secondary media stream is displayed within a primary media stream. In response to receiving a first user selection of two media streams for simultaneous viewing on a display device, a second user selection of a primary media stream and a secondary media stream from the two media streams selected for simultaneous viewing is received. A set of inset definitions is extracted from metadata in the secondary media stream. A third user selection of an inset definition from the set of inset definitions is received. A user input is received to display the primary media stream to accommodate a size of the inset definition selected. The primary media stream is displayed to create an inset area for displaying the secondary media stream within the primary media stream based on the user input. The secondary media stream is displayed within the inset area of the displayed primary media stream for user viewing.

20 Claims, 7 Drawing Sheets (51) Int. Cl.
*H04N 5/765* (2006.01)
*H04N 21/431* (2011.01)
*H04N 21/434* (2011.01)
*H04N 21/443* (2011.01)
*H04N 21/478* (2011.01)
*H04N 21/485* (2011.01)
*H04N 9/82* (2006.01)

(52) U.S. Cl.
CPC ........ *H04N 21/434* (2013.01); *H04N 21/4312* (2013.01); *H04N 21/4438* (2013.01); *H04N 21/478* (2013.01); *H04N 21/4858* (2013.01); *H04N 9/8205* (2013.01); *H04N 9/8227* (2013.01)

(56) References Cited

U.S. PATENT DOCUMENTS

| | | | |
|---|---|---|---|
| 6,822,693 | B2 | 11/2004 | Bates et al. |
| 7,496,277 | B2 | 2/2009 | Ackley et al. |
| 8,261,307 | B1* | 9/2012 | Islam et al. ............ 725/62 |
| 2002/0178447 | A1 | 11/2002 | Plotnick et al. |
| 2005/0019015 | A1* | 1/2005 | Ackley et al. ............ 386/95 |
| 2005/0210524 | A1 | 9/2005 | Dolph |
| 2005/0229222 | A1 | 10/2005 | Relan et al. |
| 2005/0273830 | A1 | 12/2005 | Silver et al. |
| 2006/0251382 | A1* | 11/2006 | Vronay et al. ............ 386/52 |
| 2008/0022352 | A1* | 1/2008 | Seo et al. ............ 725/142 |
| 2009/0033619 | A1* | 2/2009 | Oh ............ 345/156 |
| 2009/0115901 | A1* | 5/2009 | Winter et al. ............ 348/565 |
| 2010/0194979 | A1* | 8/2010 | Blumenschein et al. ...... 348/468 |
| 2010/0239222 | A1 | 9/2010 | Bhogal et al. |

FOREIGN PATENT DOCUMENTS

| | | |
|---|---|---|
| JP | 2003101893 A | 4/2003 |
| JP | 2003174598 A | 6/2003 |
| JP | 2006211322 A | 8/2006 |
| JP | 2007526659 A | 9/2007 |

OTHER PUBLICATIONS

"Apple TV DVR interface revealed in patent filings", Mar. 13, 2008, AppleInsider, pp. 1-10.

Office Action issued on Feb. 16, 2012 for U.S. Appl. No. 12/407,992, 35 pages.

Final Office Action issued on Aug. 29, 2012 for U.S. Appl. No. 12/407,992, 44 pages.

* cited by examiner

XML INSET DEFINITION
700

```
<media-stream xmlns="urn:aaa:params:xml:ns:media-stream" xmlns:xsi="
http://media:aaa.org/2001/MediaXMLSchema-Instance">
702 ~ <list name="streams">
    704 ~ <entry region="1">
        <location w="0" x="100" y="50" z="100" />
        <priority>1</priority>
        <description>News Ticker</description>
    </entry>
    706 ~ <entry region="2">
        <location w="51" x="100" y="100" z="100" />
        <priority>2</priority>
        <description>Stock Ticker</description>
    </entry>
</list>
</media-stream>
```

DIGITAL VIDEO RECORDER BROADCAST OVERLAYS

This application is a continuation of and claims the benefit of priority to U.S. patent application Ser. No. 12/407,992, filed Mar. 20, 2009 and entitled "Digital Video Recorder Broadcast Overlays", the contents of which are hereby incorporated by reference.

BACKGROUND OF THE INVENTION

1. Field of the Invention

The present invention relates generally to an improved data processing system and more specifically to a computer implemented method, system, and computer usable program code for overlaying a portion of a broadcasted television channel onto a portion of another broadcasted television channel or recorded programming.

2. Description of the Related Art

A digital video recorder (DVR) or personal video recorder (PVR) is a device that records video in a digital format onto a hard disk drive or other storage medium. The term DVR includes stand-alone set-top boxes and software for personal computers, which enable video capture and playback to and from a hard disk drive. It is estimated that by the year 2009, 47.4 million households in the United States will have a DVR.

DVRs provide several enhancements to similar devices, such as videocassette recorders (VCRs), including convenient "time shifting." Time shifting is the recording of programming to a storage medium to be viewed or listened to at a more convenient time to the user. Additionally, a DVR enables "trick modes," such as pausing live television (TV), instant replay of interesting scenes, chasing playback, and skipping advertising. Pausing live TV is a feature of DVRs that enables a user to stop the video and display a still frame. Often, the user may resume the video at the point of the pause. Instant replay is a feature of DVRs that enables a user to quickly review recently rendered video. Chase play is a time shifting function of DVRs. Chase play allows a user to simultaneously watch, stop, or pause live TV, while continuing to record a program to its conclusion. Most DVRs use the Moving Picture Experts Group (MPEG) format for encoding analog video signals.

Additionally, many DVRs and TV receivers provide a feature known as Picture-in-Picture (PiP). PiP allows viewers to view two pieces of media simultaneously using two separate tuners. Typically, the main media selection is viewed in full screen with audio, while the second media selection is displayed in an inset window. PiP technology allows users to select two media streams or channels to view, but the entire frame of each media stream is displayed. The media streams are displayed, for example, in side by side, top and bottom, or full screen with movable inset window, but in all cases the entire media stream or "screen" of both media sources is displayed.

BRIEF SUMMARY OF THE INVENTION

According to one embodiment of the present invention, a secondary media stream is displayed within a primary media stream. In response to receiving a first user selection of two media streams from a plurality of multiplexed channels for simultaneous user viewing on a display device, a second user selection of a primary media stream and a secondary media stream from the two media streams selected for simultaneous user viewing is received. Then, a set of inset definitions is extracted from metadata in the secondary media stream. A third user selection of an inset definition from the set of inset definitions included in the metadata of the secondary media stream is received. A user input is received to crop the primary media stream to accommodate a size of the inset definition selected. Then, the primary media stream is cropped to create an inset area for displaying the secondary media stream within the primary media stream based on the user input. Then, the secondary media stream is displayed within the inset area of the cropped primary media stream for simultaneous user viewing on the display device.

DETAILED DESCRIPTION OF THE INVENTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device. As used herein, the term computer-usable medium does not encompass a propagation media. As used herein, the term computer-readable medium does not encompass a propagation media. As used herein, the term computer-readable storage device does not encompass a propagation media.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
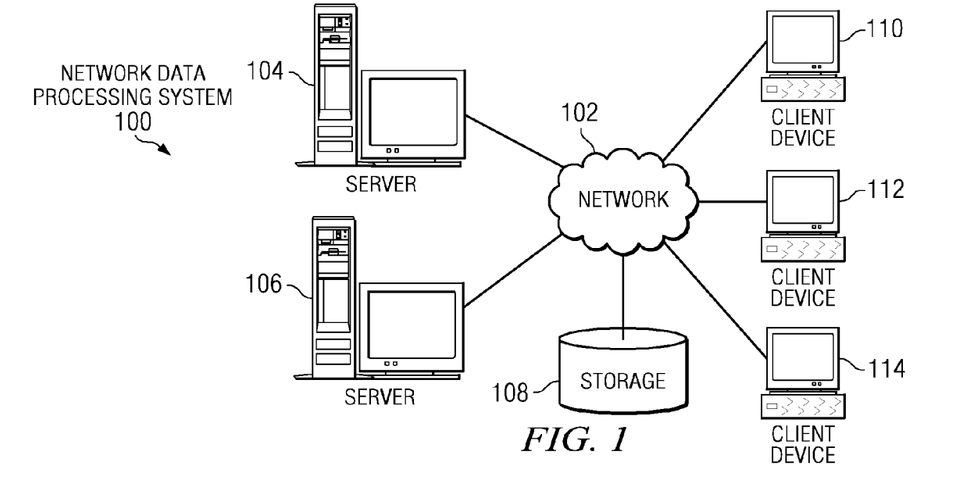
FIG. 1 is a pictorial representation of a network of data processing systems in which illustrative embodiments may be implemented.
Figure 2:
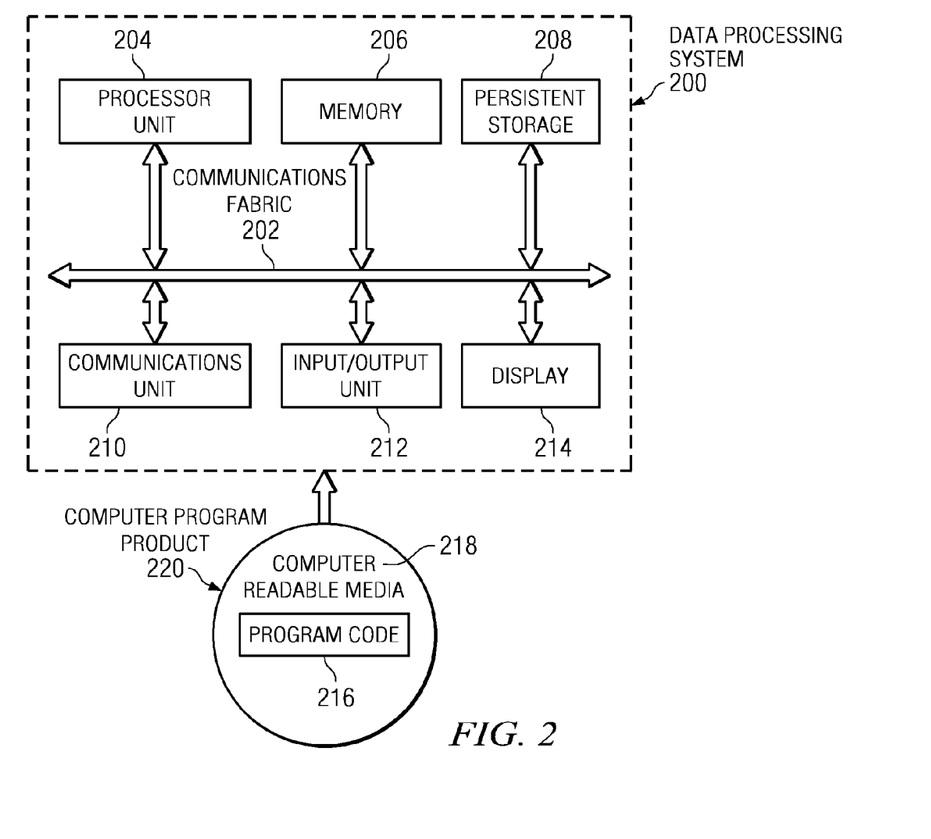
FIG. 2 is a diagram of a data processing system in which illustrative embodiments may be implemented.
Figure 3:
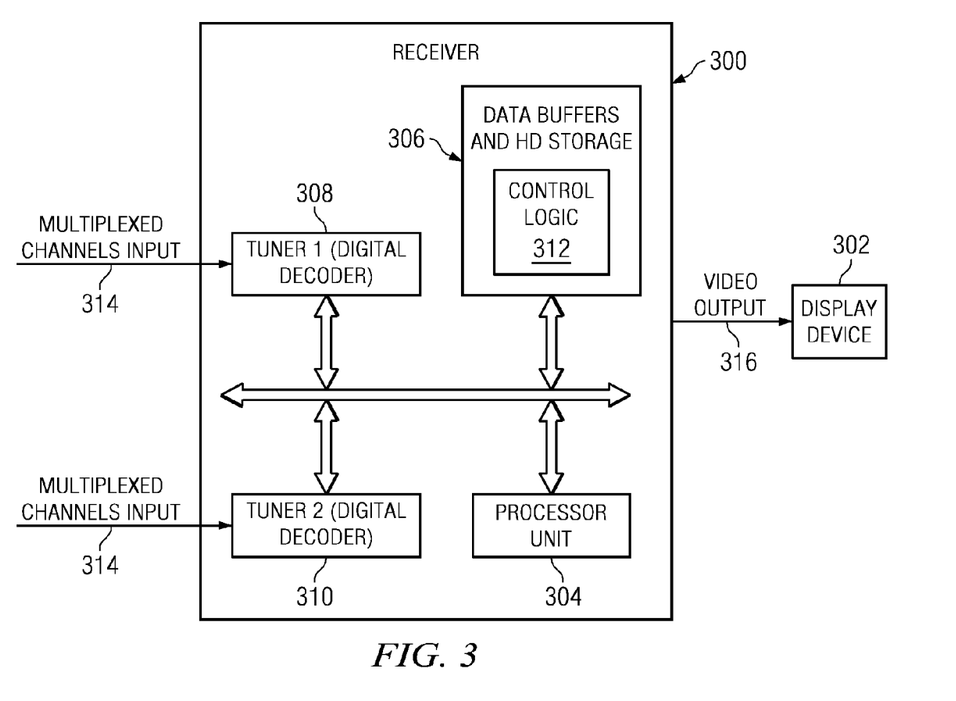
FIG. 3 is an exemplary block diagram of a broadcast signal receiver in accordance with an illustrative embodiment.

With reference now to the figures and in particular with reference to FIGS. 1-3, exemplary diagrams of data processing environments are provided in which illustrative embodiments may be implemented. It should be appreciated that FIGS. 1-3 are only exemplary and are not intended to assert or imply any limitation with regard to data processing environments in which different illustrative embodiments may be implemented. Many modifications to the depicted environments may be made.

FIG. 1 depicts a pictorial representation of a network of data processing systems in which illustrative embodiments may be implemented. Network data processing system 100 is a network of data processing systems, such as, for example, computers, broadcast signal receivers, and other devices, in which illustrative embodiments may be implemented. A broadcast signal receiver may, for example, be a TV set or a set-top box. A set-top box, such as a DSS box or cable box, is a device that connects to a TV and an external source of signal, turning the signal into content, which is then displayed on a screen of a TV.

Network data processing system 100 contains network 102. Network 102 is the medium used to provide communications links between the various devices connected together within network data processing system 100. Network 102 may include connections, such as wire, wireless communication links, or fiber optic cables.

In the depicted example, server 104 and server 106 connect to network 102, along with storage unit 108. Server 104 and server 106 represent TV programming service providers, such as cable, satellite, and fiber optic television programming service providers. In addition, server 104 and server 106 may represent a network of computers and other devices necessary for these service providers to provide the TV programming service.

Storage 108 represents any type of storage device that is capable of storing data in a structured or unstructured format. Also, storage 108 may represent a plurality of storage units coupled to network 102. Storage 108 may, for example, be a database that stores customer data, such as personal information and preference settings for personal program viewing and/or television programming data for a television programming service provider.

Further, client devices 110, 112, and 114 also connect to network 102. Client devices 110, 112, and 114 may, for example, be broadcast signal receivers, personal computers, or any other device capable of receiving media broadcast signals. Client devices 110, 112, and 114 are clients to server 104 and/or server 106 in this example. Server 104 and server 106 provide a plurality of media data streams containing television programming content to client devices 110, 112, and 114. Furthermore, server 104 and server 106 may provide other data, such as boot files, operating system images, and applications to client devices 110, 112, and 114. Moreover, network data processing system 100 may include additional servers, clients, and other devices not shown.

Of course, network data processing system 100 may be implemented as a number of different types of networks, such as, for example, an intranet, a local area network (LAN), a wide area network (WAN), or the Internet. Also, is should be noted that FIG. 1 is only intended as an example and not as an architectural limitation for the different illustrative embodiments.

With reference now to FIG. 2, a block diagram of a data processing system is shown in which illustrative embodiments may be implemented. Data processing system 200 is an example of a computer, such as server 104 in FIG. 1, or a client device, such as client device 110 in FIG. 1, in which computer usable program code or instructions implementing the processes of the illustrative embodiments may be located. In this illustrative example, data processing system 200 includes communications fabric 202, which provides communications between processor unit 204, memory 206, persistent storage 208, communications unit 210, input/output (I/O) unit 212, and display unit 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory (RAM) or any other suitable volatile or non-volatile storage device. Persistent storage 208 may take various forms depending on the particular implementation. For example, persistent storage 208 may contain one or more components or devices. For example, persistent storage 208 may be a hard disk drive, a flash memory, a rewritable optical disk, a rewritable magnetic tape, or some combination of the above. The media used by persistent storage 208 also may be removable. For example, a removable hard disk drive may be used for persistent storage 208. In addition, persistent storage 208 may represent a plurality of persistent storage units.

Communications unit 210, in these examples, provides for communications with other data processing systems or devices, such as, for example, server 104 and server 106 in FIG. 1. In these examples, communications unit 210 is a network interface card. Communications unit 210 may provide communications through the use of either, or both, physical and wireless communications links.

Input/output unit 212 allows for input and output of data with other devices, such as a TV set, which may be connected to data processing system 200. For example, input/output unit 212 may provide a connection for user input through an alphanumeric keypad. Display unit 214 provides a mechanism to display information to a user of data processing system 200.

Instructions for the operating system and applications or programs are located on persistent storage 208. The operating system may, for example, be a Linux® operating system. An application may, for example, be broadcast signal receiver software that includes programming selection and control logic.

The instructions for the operating system and applications or programs may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different illustrative embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different illustrative embodiments may be implemented. The different illustrative embodiments may be implemented in a data processing system including components in addition to, or in place of, those illustrated for data processing system 200. Other components shown in FIG. 2 may be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub, which may be present in communications fabric 202.

With reference now to FIG. 3, an exemplary block diagram of a broadcast signal receiver is depicted in accordance with an illustrative embodiment. Receiver 300 may, for example, be client device 110 in FIG. 1 and implemented in data processing system 200 in FIG. 2. Receiver 300 is coupled to display device 302. It should be noted that receiver 300 and display device 302 may be located within the same device, such as a TV set. Alternatively, receiver 300 and display device 302 may be located in separate devices. For example, receiver 300 may be located in a set-top box, such as a cable box, and display device 302 may be located in a TV set.

Receiver 300 is capable of receiving cable, satellite, or fiber optic broadcast media signals from, for example, TV programming service providers. Receiver 300 includes processor unit 304, data buffers and hard drive (HD) storage 306, tuner 308, and tuner 310. Processor unit 304 may, for example, be processor unit 204 in FIG. 2. Processor unit 304 provides the processing capabilities for receiver 300.

Data buffers and HD storage 306 may, for example, be memory 206 and persistent storage 208 in FIG. 2. Data buffers and HD storage 306 provide the data storage capabilities for receiver 300. The data buffers may, for example, provide transient data storage for incoming broadcast media of selected channel numbers. Illustrative embodiments may, for example, provide a thirty minute data buffer for each tuner. However, it should be noted that illustrative embodiments may provide more or less data buffer time for each tuner. The HD storage provides persistent storage of data.

Data buffers and HD storage 306 stores control logic 312. Control logic 312 may, for example, be computer program product 220 in FIG. 2. Control logic 312 provides the logic for controlling all processes, such as a media stream cropping process, within receiver 300.

Tuner 308 and tuner 310 receive multiplexed channels input 314. Multiplexed channels input 314 represent a plurality of incoming TV channel media streams, which are provided by one or more TV programming service providers. Tuners 308 and 310 decode incoming multiplexed channels input 314 to capture live media content for current viewing by a viewer and/or to capture time shift media recording for later viewing by a viewer upon request. Both tuner 308 and tuner 310 may perform either of these functions. In addition, it should be noted that receiver 300 may include more than two tuners. As a result, receiver 300 may capture three or more TV channel media streams simultaneously, depending upon the number of tuners included within receiver 300.

Receiver 300 stores the live media content data and time shift media recording data in data buffers and HD storage 306. Then, receiver 302 utilizes control logic 312 to form video output 316 using the saved live media content data and/or time shift media recording data. In addition, receiver 302 may store and output channel guide data and setup menus and control data, which may also be included in multiplexed channels input 314. Further, receiver 300 may also record and store user viewing preferences. The user viewing preferences may, for example, define how a user wishes to view a plurality of TV channel media streams simultaneously on display device 302.

Control logic 312 controls which portions of the plurality of TV channel media streams are to be included in video output 316 and where each of the plurality of TV channel media streams are to be incorporated into video output 332. After producing video output 316 using the desired content from the different TV channel media streams based on user viewing preference input, control logic 312 sends video output 316 to display device 302. Display device 302 displays video output 316 to the viewer. Display device 302 may, for example, be a display screen in a TV set or a computer.

Illustrative embodiments provide a computer implemented method, system, and computer usable program code for DVRs and traditional TV tuners to provide enhanced PiP capabilities, which include the ability for the end-user, media supplier, or the media stream, itself, to define only a portion or region of an entire media stream to be inset and displayed in a particular position within another media stream being displayed in a display screen to a user. For example, in one illustrative embodiment, a user may specify that the bottom 20% of a secondary media stream is to be displayed as an inset within the top 20% of a primary media stream being displayed on a screen. In another illustrative embodiment, the media stream, itself, of a TV channel may define a region of its media stream, such as, for example, a "news ticker," as a high priority item that may be easily selected and retrieved as the secondary media stream content to be displayed as an inset within a primary media stream of another TV channel. Thus, illustrative embodiments may provide an increased end-user experience and possibly provide more efficient use of network bandwidth.

Illustrative embodiments utilize a receiver with at least two separate tuners that may be used simultaneously. However, receivers with more than two tuners may also be utilized, which would allow illustrative embodiments to provide two or more secondary media stream insets from a plurality of different TV channels. Also, even though illustrative embodiments are described as being applied to TV channel media stream networks, it should be appreciated by those of ordinary skill in the art that illustrative embodiments may also be applied to any type of network computing environment, such as, for example, the Internet, video conferencing, collaborative work environments, video on demand, and other types of multimedia networking applications, without departing from the scope and spirit of illustrative embodiments.

In one illustrative embodiment, the media stream, itself, defines regions within the media stream via extra information, or metadata, which is delivered to and understood by the receiving broadcast signal receiver. The metadata may, for example, be delivered using a similar method for delivering information, such as closed captioning. Also, the metadata may be in a standard definition format, such as, for example, XML, which both describes and defines the predefined media stream regions used for display as an inset. The metadata delivered with the media stream content may be used to build intuitive user interfaces for selecting and understanding that the media stream content has been identified to be displayed as an inset within one or more particular regions of a primary media stream. These inset regions within the primary media stream are selectable via one or more selection methods. For example, a user may use a menu list selection, such as only use regions one and three as the inset regions for the one or more secondary media streams or the user may use a priority setting, such as use all priority one regions as the inset area for the secondary media streams.

In addition, the primary media stream of a particular channel may suggest one or more secondary media streams from different channels, which compliment the primary media stream's content, to be used as insets within the primary media stream. For example, the media stream of a channel, such as CNN, which a user is viewing on a display device as the primary media content, may suggest to the user via an intuitive user interface a portion or region of another channel's media stream, such as a news ticker from CNN Headline News, which compliments the content of the primary media stream, to be used as an inset within an inset area of the primary media content. Further, the user using the intuitive user interface may, for example, define a set of criteria or rules that specify when insets containing secondary media content may automatically "pop-up" within the primary media stream's content in the event the criteria are satisfied. For example, the user may define a rule that will automatically cause a news ticker from a specified secondary media stream source, such as CNBC, to be displayed as an inset within the primary media stream's content in the event the DOW falls below a set point or by a set percentage.

In another illustrative embodiment, the supplier of the media stream content, such as a cable company or satellite company, may define inset regions for media stream content on particular channels. Possible benefits of this illustrative embodiment are multiple. For example, knowing which regions or portions of media stream content on a particular channel are being viewed by users, the media stream supplier may limit delivery of that particular channel to only those regions of the media stream actually being viewed, thus reducing network bandwidth use.

In addition, the media stream supplier may define advertisement channels to include multiple inset advertisement regions so that users may voluntarily select one or more of these inset advertisement regions for viewing. The media stream supplier may provide an incentive, such as, for example, a lower service rate, to encourage users to view these inset advertisement regions. If users on such reduced rate plans do not select particular inset advertising regions, a priority selection system may be utilized by the media stream provider so that additional revenue opportunity may be given to the media stream provider, such as, for example, charging advertisers more for advertising in higher priority inset regions.

Further, media stream suppliers may add additional attributes to the metadata provided by the XML information contained within the media stream content. For example, media stream suppliers may define target age groups for the inset advertisement regions instead of applying a priority selection system. Target age group definitions may be related to the primary media stream's content. For example, a correlation may be created to show the most appropriate inset advertisement for a cartoon show being viewed by younger children. As a result, the inset advertisement region within the primary media content (i.e., the cartoon show) displays an inset advertisement associated with the lowest defined target age group.

In yet another illustrative embodiment, the end-user may define the region of the primary media stream to be used as the inset area for displaying the secondary media content. The user may define the inset region by, for example, specifying a percentage, such as, for example, the bottom 20% or top 10%, of the primary media stream being displayed via input of the percentage value and a starting reference, such as bottom, top, left, right, via user inputs on a remote control device or on a user input panel on the receiver.

Figure 4:
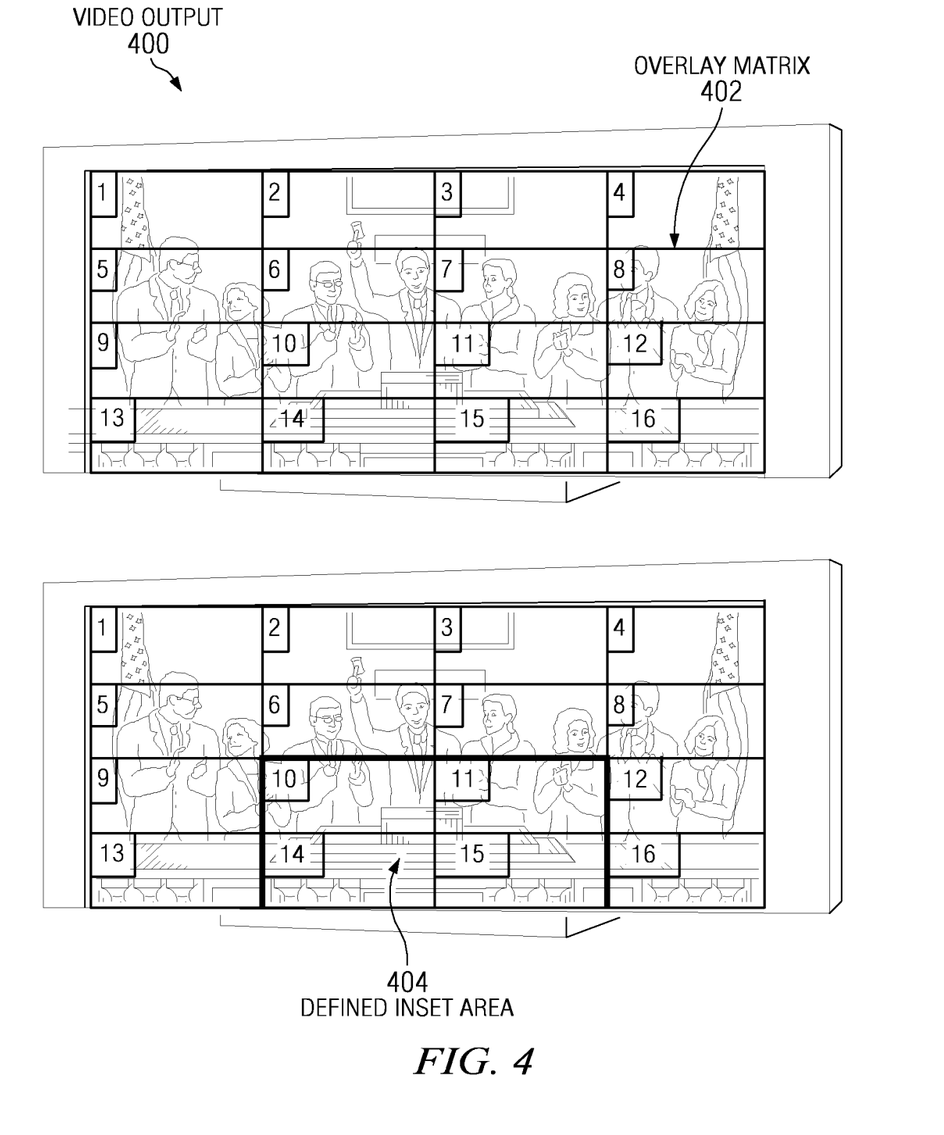
FIG. 4 is an exemplary illustration of video output with an overlay matrix in accordance with an illustrative embodiment.

Selecting one or more of these inset regions may, for example, be accomplished via a numbered overlay matrix displayed over the primary media stream, such as that shown in the illustrative example of FIG. 4. The user by entering one or more specific values, such as, for example, inset region 10, inset region 11, inset region 14, and inset region 15 associated with the overlay matrix, may specify the regions that will be used as the inset area to display the one or more secondary media streams. Further, selecting one or more inset regions may be accomplished via a moving horizontal marker overlay, such as that shown in the illustrative example of FIG. 5, and a vertical marker overlay, which a user may utilize either individually or in combination with each other, to form the desired inset display area. The user by utilizing, for example, arrow keys on a remote control may position the horizontal and/or vertical overlay markers to create the inset areas for displaying the media stream content of one or more secondary channels.

Moreover, selecting one or more inset regions may be accomplished via a picture cropping model to create the inset display regions. The user by using an enhanced remote control device with, for example, a trackball, may crop the primary media stream to create the inset regions for display of the secondary media content within the primary media stream. In addition, the enhanced remote control device may allow the user to initiate swap functionality via, for example, a "swap button" located on the enhanced remote control device. The swap functionality allows the user to quickly swap or exchange content located within the primary media area and the secondary media inset area. For example, the user may be viewing CNN as the content within the primary media area and an ESPN sports ticker as the content within the secondary media inset area. Upon activation of the swap functionality via the swap button on the enhanced remote control device, the user is able to switch the content within the primary media area to the ESPN media stream (e.g., a sporting event) and the content within the secondary media inset area to a news ticker from the CNN media stream.

It should be noted that the selected inset region may be interactively overlaid in a particular location defined by the user, the media, or the media supplier. Alternatively, the selected inset region may be set side by side or top and bottom with the primary media content. In addition, the selected inset region may be positioned in one of four quadrants of the available screen real estate. Moreover, each of the above-described methods may be used in combination with itself or possibly in combination with one or more other methods to provide customized inset display areas, such as, for example, an "L" shaped inset display area. Thus, illustrative embodiments are not limited to only displaying the inset region in the shape of a rectangle or a square. Also, illustrative embodiments may, for example, display the inset region in the shape of a circle, oval, triangle, octagon, hexagon, pentagon, or any other regular or irregular shape, such as a star. Furthermore, illustrative embodiments may display an inset area within another inset area and each of the inset areas may form different shapes.

Also, it should be noted that the described illustrative embodiments above may be used independently or in conjunction with each other. For example, a user may utilize user-defined regions to select placement of inset media content and also utilize media-defined regions to select the media content to display within the inset. Furthermore, it should be noted that the larger primary media content region, or non-inset area, may either be scaled as in PiP or may be cropped to accommodate the inset media stream content from one or more different TV channels.

Furthermore, illustrative embodiments allow for the inset media stream content regions to be displayed with varying degrees of transparency. The degree of transparency may, for example, be set with a percentage value, such as 0%-100%, via user remote control entry or stored user viewing preferences for each individual inset media stream region or for all inset media stream regions.

With reference now to FIG. 4, an exemplary illustration of video output with an overlay matrix is depicted in accordance with an illustrative embodiment. Video output 400 may, for example, be video output 316 in FIG. 3. Video output 400 is the video output of a broadcast signal receiver, which is controlled by a control logic, such as control logic 312 within receiver 300 in FIG. 3. In this particular illustrative example, video output 400 is the display of a primary media stream's content of a particular TV channel on a display device, such as display device 302 in FIG. 3, for a user to view.

The broadcast signal receiver's control logic displays overlay matrix 402 in response to a user input on, for example, a remote control device or user control panel on the receiver, to display overlay matrix 402 over the primary media stream's content within video output 400. A user uses overlay matrix 402 to select one or more regions within the primary media stream as inset areas for displaying the content of one or more secondary media streams from one or more different TV channels within the primary media stream content.

In this illustrative example, overlay matrix 402 includes regions 1-16, consecutively numbered starting from the upper left corner and ending in the lower right corner. However, overlay matrix 402 is only intended as an example and not as a limitation on illustrative embodiments. In other words, overlay matrix 402 may include more or fewer inset regions. In addition, illustrative embodiments may utilize any type of matrix capable of being used by processes of illustrative embodiments. Further, illustrative embodiments may use any type of region identification system to identify the different regions in overlay matrix 402.

Also in this illustrative example, overlay matrix 402 includes defined inset area 404. Defined inset area 404 is the user-selected or defined area where the user desires to display the content of one or more secondary media streams from one or more different TV channels as insets within the primary media stream of video output 400. Defined inset area 404 is composed of inset regions 10, 11, 14, and 15 associated with overlay matrix 402. However, it should be noted that the user may select any combination of the regions within overlay matrix 402 to create one or more defined inset areas for displaying secondary media streams.

Figure 5:
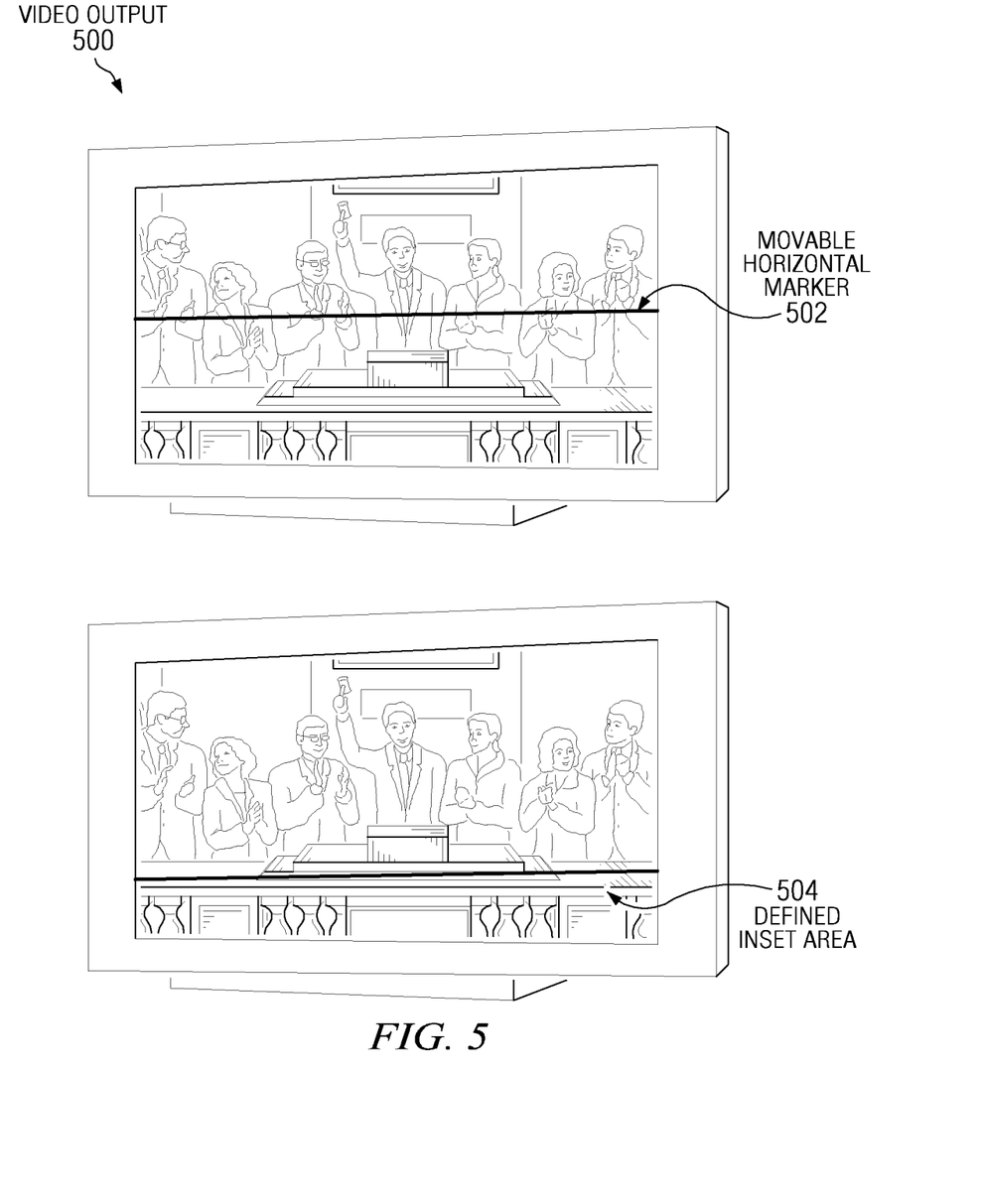
FIG. 5 is an exemplary illustration of video output with a movable horizontal marker in accordance with an illustrative embodiment.

With reference now to FIG. 5, an exemplary illustration of video output with a movable horizontal marker is depicted in accordance with an illustrative embodiment. Video output 500 may, for example, be video output 316 in FIG. 3, which is shown on a display device, such as display device 302 in FIG. 3, for a user to view. In this particular illustrative example, the broadcast signal receiver's control logic displays movable horizontal marker 502 in response to a user input on, for example, a remote control device, to display movable horizontal marker 502 over the primary media stream's content within video output 500.

A user uses arrow keys or a track ball on the remote control device to position movable horizontal marker 502 to define one or more regions within the primary media stream as inset areas for displaying the content of one or more secondary media streams from one or more different TV channels within the primary media stream content. In addition, illustrative embodiments may utilize a movable vertical marker, not shown, instead of or in addition to movable horizontal marker 502 to define regions within the primary media stream as inset areas. Also in this illustrative example, video output 500 includes defined inset area 504. The user repositions movable horizontal marker 502 so that defined inset area 504 only includes the lower portion of the primary media stream's content within video output 500. Defined inset area 504 is the user-selected or defined area where the user desires to display the content of one or more secondary media streams from one or more different TV channels as insets within the primary media stream of video output 500.

Figure 6:
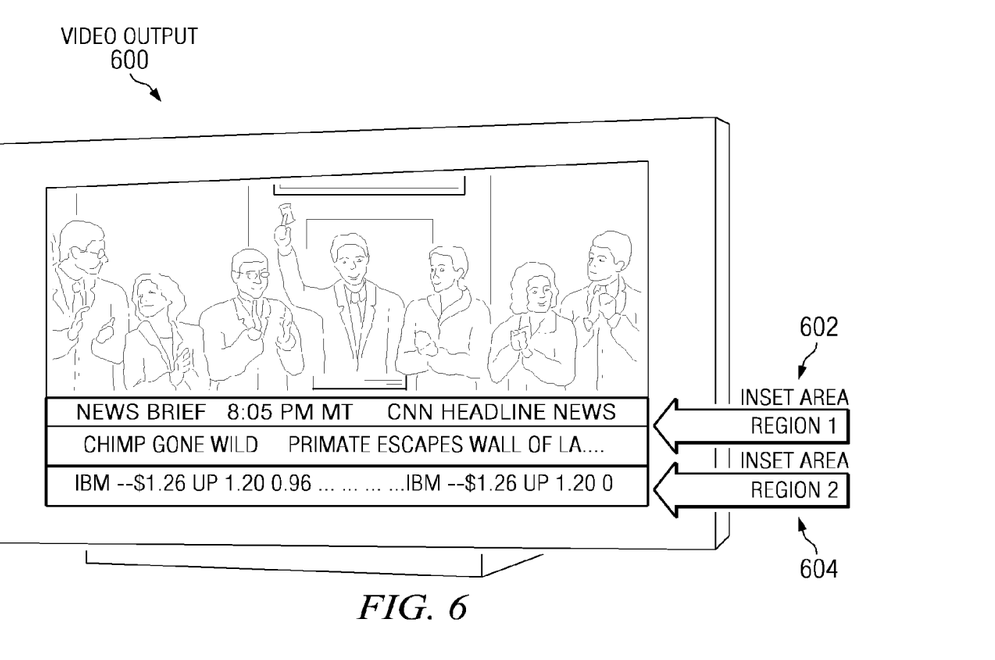
FIG. 6 is an exemplary illustration of video output with multiple inset regions in accordance with an illustrative embodiment.

With reference now to FIG. 6, an exemplary illustration of video output with multiple inset regions is depicted in accordance with an illustrative embodiment. Video output 600 may, for example, be video output 316 in FIG. 3, which is shown on a display device, such as display device 302 in FIG. 3, for a user to view. In this particular illustrative example, the broadcast signal receiver's control logic displays inset area region 1 602 and inset area region 2 604 within the primary media stream's content in video output 600.

Inset area region 1 602 and inset area region 2 604 represent the content of two different secondary media streams from two different TV channels displayed within the primary media stream content of a third TV channel. The secondary media streams may, for example, include metadata that defines inset area region 1 602 and inset area region 2 604. Alternatively, a user may, for example, utilize a movable horizontal marker, such as movable horizontal marker 502 in FIG. 5, to define inset area region 1 602 and inset area region 2 604. Inset area region 1 602 may, for example, be a "news ticker" inset taken from a news TV channel and inset area region 2 606 may, for example, be a "stock ticker" inset taken from a financial TV channel. The primary media stream content may, for example, be a major network TV channel, such as ABC, NBC, CBS, or FOX, a major movie channel, such as HBO, SHOWTIME, ENCORE, or STARZ, or previously recorded programming. However, it should be noted that illustrative embodiments may use any TV channel or recorded programming as a primary media stream source and/or a secondary media stream source.

Figure 7:
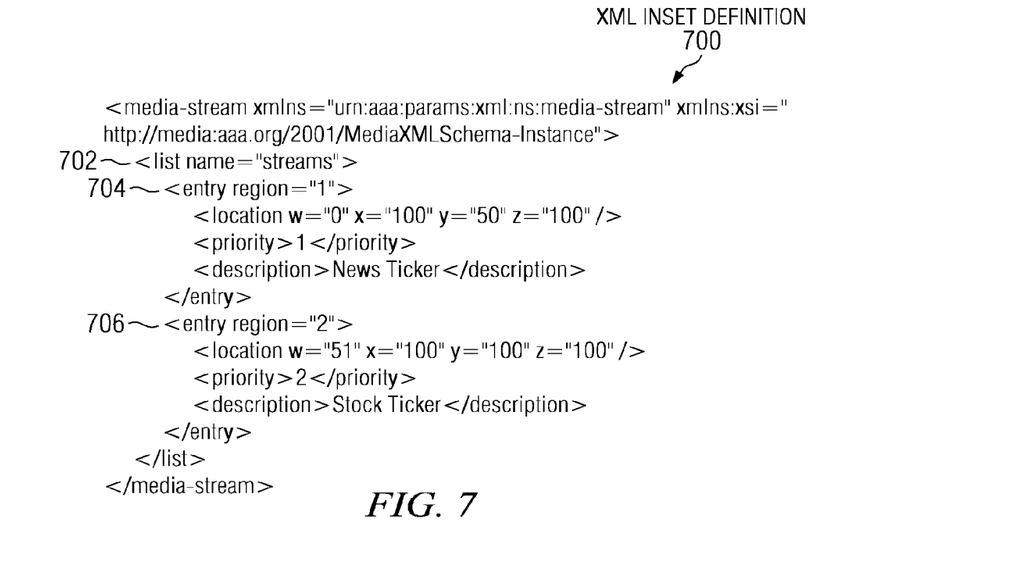
FIG. 7 is a specific example of an extensible markup language (XML) inset definition in accordance with an illustrative embodiment.

With reference now to FIG. 7, a specific example of an XML inset definition is depicted in accordance with an illustrative embodiment. XML inset definition 700 is a specific example of only one possible XML definition for defining inset regions, such as inset area region 1 602 and inset area region 2 604 in FIG. 6, within a primary media stream's content. In other words, XML inset definition 700 is only intended as an example and not as a limitation on illustrative embodiments. Illustrative embodiments may use any type of inset definition format capable of being used by processes of illustrative embodiments. XML inset definition 700 may, for example, be included within media stream metadata.

The broadcast signal receiver's control logic, such as control logic 312 in FIG. 3, uses XML inset definition 700 to define the parameters for the inset regions to display secondary media stream content. In this illustrative example, XML inset definition 700 defines parameters for two inset regions, such as those shown in the example of FIG. 6. However, it should be noted that XML inset definition 700 may define parameters for more or fewer inset regions.

XML inset definition 700 includes list of media stream names 702. List of media stream names 702 includes entry region 1 704 and entry region 2 706. Entry region 1 704 and entry region 2 706 include the specific location within a secondary media stream's content to be used as the inset, a priority setting for the inset for positioning the inset within a particular region within the primary media stream's content, and a description of the inset. However, it should be noted that entry region 1 704 and entry region 2 706 may include any necessary data for processes of illustrative embodiments.

Figure 8:
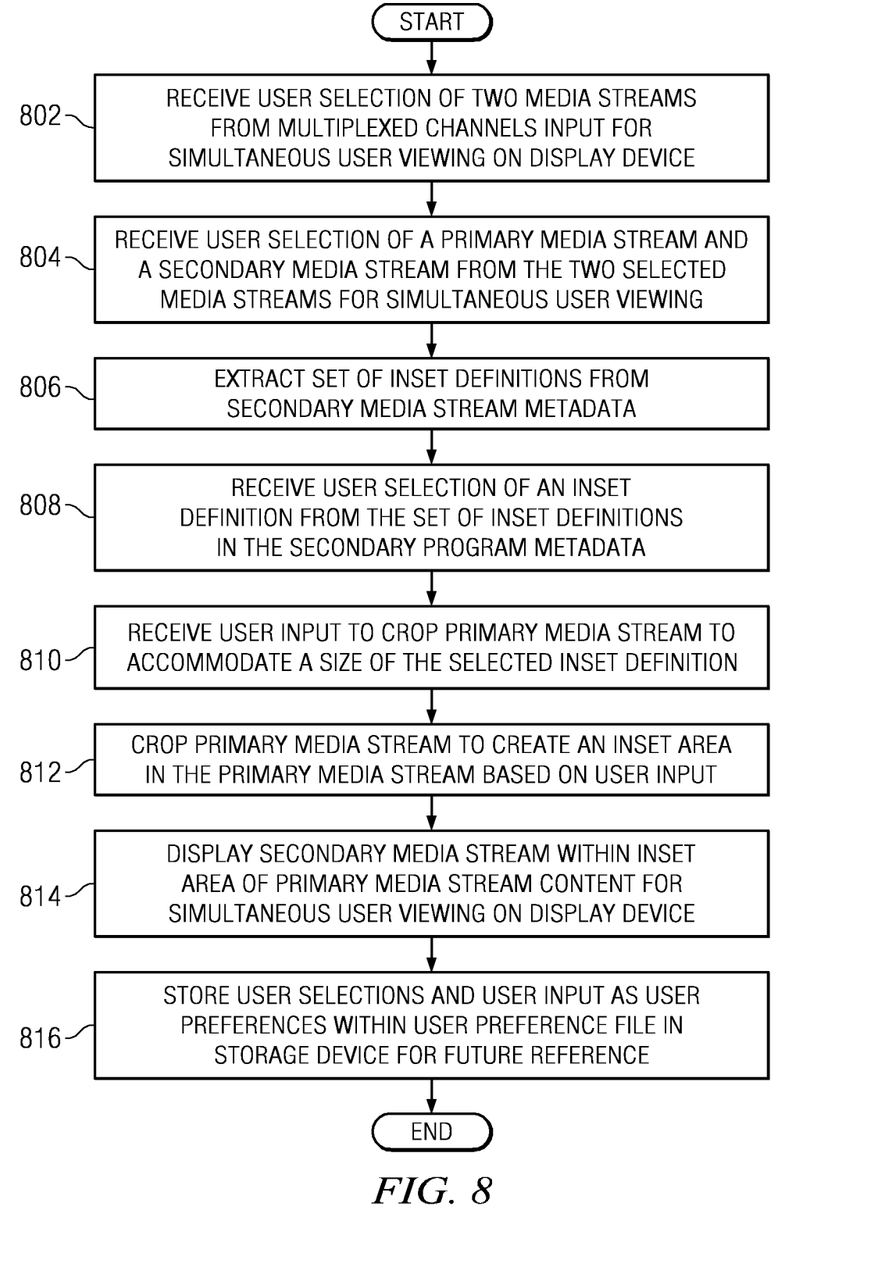
FIG. 8 is a flowchart illustrating an exemplary process for simultaneously displaying multiple video outputs that are cropped based on regions defined by the media streams in accordance with an illustrative embodiment.

With reference now to FIG. 8, a flowchart illustrating an exemplary process for simultaneously displaying multiple video outputs that are cropped based on regions defined by the media streams is shown in accordance with an illustrative embodiment. The process shown in FIG. 8 may be implemented in a receiver, such as receiver 300 in FIG. 3.

The process begins when the receiver uses a control logic, such as control logic 312 in FIG. 3, to receive a user selection of two media streams or programs from a multiplexed channels input, such as multiplexed channels input 314 in FIG. 3, for simultaneous user viewing on a display device, such as display device 302 in FIG. 3 (step 802). Then, the control logic receives a user selection of a primary media stream and a secondary media stream from the two selected media streams for simultaneous user viewing (step 804). Afterward, the control logic extracts a set of inset definitions from the secondary media stream's metadata (step 806).

Subsequently, the control logic receives a user selection of an inset definition, such as XML inset definition 700 in FIG. 7, from the set of inset definitions in the secondary media stream's metadata (step 808). Then, the control logic receives a user input to crop the primary media stream to accommodate a size of the selected inset definition (step 810). Afterward, the control logic crops the primary media stream to create an inset area, such as defined inset area 504 in FIG. 5, within the primary media stream content based on the user input (step 812). Subsequently, the control logic displays the content of the secondary media stream within the inset area of the primary media stream content for simultaneous user viewing on the display device (step 814). In addition, the control logic stores the user selections and user inputs as user preferences within a user preference file in a storage device, such as data buffers and HD storage 306 in FIG. 3, for future reference (step 816). The process terminates thereafter.

Figure 9:
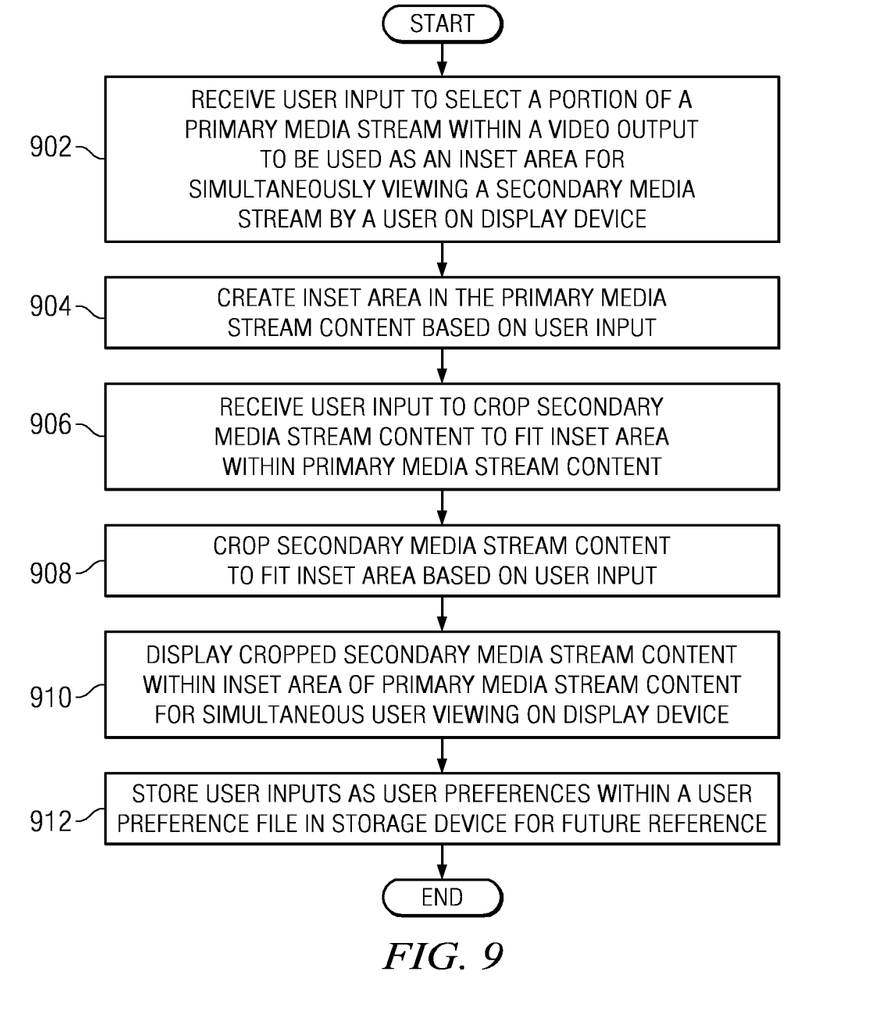
FIG. 9 is a flowchart illustrating an exemplary process for simultaneously displaying multiple video outputs that are cropped based on regions defined by a user in accordance with an illustrative embodiment.

With reference now to FIG. 9, a flowchart illustrating an exemplary process for simultaneously displaying multiple video outputs that are cropped based on regions defined by a user is shown in accordance with an illustrative embodiment. The process shown in FIG. 9 may be implemented in a receiver, such as receiver 300 in FIG. 3.

The process begins when the receiver uses a control logic, such as control logic 312 in FIG. 3, to receive a user input to select a portion of a primary media stream within a video output, such as video output 316 in FIG. 3, to be used as an inset area for simultaneously viewing content of a secondary media stream by a user on a display device, such as display device 302 in FIG. 3 (step 902). Then, the control logic creates the inset area within the primary media stream content based on the user input (step 904). Afterward, the control logic receives a user input to crop the secondary media stream content to fit the inset area within the primary media stream content (step 906).

Then, the control logic crops the secondary media stream content to fit the inset area based on the user input (step 908). Subsequently, the control logic displays the cropped secondary media content within the inset area of the primary media stream content for simultaneous user viewing on the display device (step 910). In addition, the control logic stores the user inputs as user preferences within a user preference file in a storage device, such as data buffers and HD storage 306 in FIG. 3, for future reference (step 912). The process terminates thereafter.

Thus, illustrative embodiments of the present invention provide a computer implemented method, system, and computer program product for providing the ability for the end-user, the media supplier, or the media stream, itself, to define only a portion or region of an entire media stream to be inset and displayed in a particular position within another media stream being displayed in a display screen to a user. The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for displaying a secondary media stream within an opening in a display of a primary media stream, the method comprising the steps of:

a computer receiving selections by a user of a primary media stream and a secondary media stream for concurrent display on a screen;

the computer extracting, and presenting to the user, a plurality of inset definitions from metadata associated with the secondary media stream, the plurality of inset definitions specifying a respective plurality of different manners of displaying a perimeter region of the secondary media stream;

the computer receiving a selection by a user of one of the presented inset definitions to display the secondary media stream;

the computer receiving a request by a user to insert the secondary media stream in the primary media stream, and in response, the computer displaying the secondary media stream, displayed according to the one inset definition, within the opening in the display of the primary media stream, a size of the opening in the display of the primary media stream being substantially the same as a size of the secondary media stream, displayed according to the one inset definition.

2. The method of claim 1, wherein the respective plurality of different manners of displaying the perimeter region of the secondary media stream include one of displaying a full area of the perimeter region of the secondary media stream and displaying a subset of the full area of the perimeter region of the secondary media stream.

3. The method of claim 1, further comprising the steps of:
the computer storing the user selection of the primary media stream, the user selection of the secondary media stream, the user selection of the one inset definition, and the request of the user to insert the secondary media stream in the primary media stream in a storage device; and the computer associating the user selection of the secondary media stream with an incentive service rate that encourages a user to view the secondary media stream;

wherein the one inset definition lists a name of the secondary media stream, specifies a specific location of content within the secondary media stream to be displayed, in the opening, sets a priority value for the one inset, and provides a description of the one inset.

4. The method of claim 3, wherein an inset is one of a plurality of insets to be placed by the computer within the primary media stream, and wherein each of the plurality of insets are taken by the computer from a different secondary media stream; and
wherein the metadata includes a numbered overlay matrix displayed over the primary media stream, the numbered overlay matrix comprising at least two inset regions with corresponding values, and wherein the secondary media stream is displayed in an inset region identified by a corresponding value.

5. The method of claim 4, wherein the opening is one of a plurality of inset areas within the primary media stream, and wherein each of the plurality of insets are placed separately by the computer within a respective inset area of the plurality of inset areas based on a priority value set for each of the plurality of insets, and wherein each of the plurality of inset areas is defined by receiving, from a remote control device, a specification of a percentage of one of a top, a bottom, a left and a right of the primary media stream.

6. The method of claim 2, wherein the user preferences define how to simultaneously view multiple secondary media streams within the primary media stream on the display device, and wherein the metadata selects one or more secondary media streams based on a content of the one or more secondary media streams complimenting a primary media stream content.

7. The method of claim 1, further comprising:
displaying the secondary media stream with a degree of transparency specified by a user via a remote control device;

receiving, from the remote control device, a signal to exchange display locations of the displayed primary media stream and the corresponding secondary media stream;

receiving delivery of a secondary media stream content on a particular television channel only to inset regions actually being viewed by the user; and receiving, from the media stream supplier, definitions of target age groups for inset advertisement areas; wherein a target age group definition is related to content of the primary media stream, and wherein the corresponding secondary media stream is an inset advertisement associated with a lowest target age group definition.

8. A system for displaying a secondary media stream within an opening in a display of a primary media stream, the system comprising:
one or more processors, one or more computer-readable memories, one or more computer- readable storage devices, and program instructions stored on at least one of the one or more storage devices for execution by at least one of the one or more processors via at least one of the one or more memories, the program instructions comprising:
first program instructions to receive selections by a user of a primary media stream and a secondary media stream for concurrent display on a screen;

second program instructions to extract, and present to the user, a plurality of inset definitions from metadata in the secondary media stream, the plurality of inset definitions specifying a respective plurality of different manners of displaying the secondary media stream;

third program instructions to receive a selection by a user of one of the presented inset definitions to display the secondary media stream;

fourth program instructions to receive a request by a user to insert the secondary media stream in the primary media stream, and in response, display the secondary media stream, displayed according to the one inset definition, within the opening in the display of the primary media stream, a size of the opening in the display of the primary media stream being substantially the same as a size of the secondary media stream, displayed according to the one inset definition.

9. The system of claim 8, wherein the respective plurality of different manners of displaying the perimeter region of the secondary media stream include one of displaying a full area of the perimeter region of the secondary media stream and displaying a subset of the full area of the perimeter region of the secondary media stream.

10. The system of claim 8, further comprising:
fifth program instructions to store the user selection of the primary media stream, the user selection of the secondary media stream, the user selection of the one inset definition, and the request of the user to insert the secondary media stream in the primary media stream; and sixth program instructions to associate the user selection of the secondary media stream with an incentive service rate that encourages a user to view the secondary media stream;

wherein the one inset definition lists a name of the secondary media stream, specifies a specific location of content within the secondary media stream to be displayed, in the opening, sets a priority value for the one inset, and provides a description of the one inset.

11. The system of claim 8, wherein an inset is one of a plurality of insets to be placed by the computer within the primary media stream, and wherein each of the plurality of insets are taken by the computer from a different secondary media stream; and wherein the metadata includes a numbered overlay matrix displayed over the primary media stream, the numbered overlay matrix comprising at least two inset regions with corresponding values, and wherein the secondary media stream is displayed in an inset region identified by a corresponding value.

12. The system of claim 11, wherein the opening is one of a plurality of inset areas within the primary media stream, and wherein each of the plurality of insets are placed separately by the computer within a respective inset area of the plurality of inset areas based on a priority value set for each of the plurality of insets, and wherein each of the plurality of inset areas is defined by receiving, from a remote control device, a specification of a percentage of one of a top, a bottom, a left and a right of the primary media stream.

13. The system of claim 12, wherein the user preferences define how to simultaneously view multiple secondary media streams within the primary media stream on the display device, and wherein the metadata selects one or more secondary media streams based on a content of the one or more secondary media streams complimenting a primary media stream content.

14. The system of claim 11, further comprising:
fifth program instructions to display the secondary media stream with a degree of transparency specified by a user via a remote control device.
sixth program instructions to receive from the remote control device, a signal to exchange display locations of the primary media stream and the corresponding secondary media stream;
seventh program instructions to receive delivery of a secondary media stream content on a particular television channel only to inset regions actually being viewed by the user; and
eighth program instructions to receive, from the media stream supplier, definitions of target age groups for inset advertisement areas; wherein a target age group definition is related to content of the primary media stream, and wherein the corresponding secondary media stream is an inset advertisement associated with a lowest target age group definition.

15. A computer program product for displaying a secondary media stream within an opening in a display of a primary media stream, the system comprising:
one or more computer readable storage devices and program instructions stored on at least one of the one or more storage devices, the program instructions comprising:
program instructions to receive selections by a user of a primary media stream and a secondary media stream for concurrent display on a screen;
program instructions to extract, and present to the user, a plurality of inset definitions from metadata in the secondary media stream, the plurality of inset definitions specifying a respective plurality of different manners of displaying the secondary media stream;
program instructions to receive a selection by a user of one of the presented inset definitions to display the secondary media stream;
program instructions to receive a request by a user to insert the secondary media stream in the primary media stream, and in response, display the secondary media stream, displayed according to the one inset definition, within the opening in the display of the primary media stream, a size of the opening in the display of the primary media stream being substantially the same as a size of the secondary media stream, displayed according to the one inset definition.

16. The computer program product of claim 15, wherein the respective plurality of different manners of displaying the perimeter region of the secondary media stream include one of displaying a full area of the perimeter region of the secondary media stream and displaying a subset of the full area of the perimeter region of the secondary media stream.

17. The computer program product of claim 15, further comprising:
program instructions to store the user selection of the media streams, the user selection of the primary media stream, the user selection of the secondary media stream, the user selection of the inset definition, and the user input as user preferences within a user preference file in a storage device; and
computer program instructions to associate the user selection of the secondary media stream with an incentive service rate that encourages a user to view the secondary media stream;
wherein the inset definition lists a name of the secondary media stream to be included in the opening, specifies a specific location of content within the secondary media stream to be used as an inset within the opening, sets a priority value for the inset for positioning the inset within the opening, and provides a description of the inset.

18. The computer program product of claim 17, wherein the inset is one of a plurality of insets to be placed by the computer within the primary media stream, and wherein each of the plurality of insets are taken by the computer from a different secondary media stream; and
wherein the metadata includes a numbered overlay matrix displayed over the primary media stream, the numbered overlay matrix comprising at least two inset regions with corresponding values, and wherein the secondary media stream is displayed in an inset region identified by a corresponding value.

19. The computer program product of claim 18, wherein the opening is one of a plurality of inset areas within the primary media stream;
wherein each of the plurality of insets are placed separately by the computer within a respective inset area of the plurality of inset areas based on the priority value set for each of the plurality of insets;
wherein each of the plurality of inset areas is defined by receiving, from a remote control device, a specification of a percentage of one of a top, a bottom, a left and a right of the primary media stream;
wherein the user preferences define how to simultaneously view multiple secondary media streams within the primary media stream on the display device; and wherein the metadata selects one or more secondary media streams based on a content of the one or more secondary media streams complimenting a primary media stream content.

20. The computer program product of claim 15, further comprising:
- program instructions to display the secondary media stream with a degree of transparency specified by a user via a remote control device;
- program instructions to receive from the remote control device, a signal to exchange display locations of the primary media stream and the corresponding secondary media stream;
- program instructions to receive delivery of a secondary media stream content on a particular television channel only to inset regions actually being viewed by the user; and
- program instructions to receive from the media stream supplier, definitions of target age groups for inset advertisement areas; wherein a target age group definition is related to content of the primary media stream, and wherein the corresponding secondary media stream is an inset advertisement associated with a lowest target age group definition.

* * * * *